United States Patent
Hara et al.

(10) Patent No.: US 10,358,048 B2
(45) Date of Patent: Jul. 23, 2019

(54) ONBOARD BATTERY FOR VEHICLE

(71) Applicant: SUBARU CORPORATION, Tokyo (JP)

(72) Inventors: Toshiyuki Hara, Tokyo (JP); Takayuki Tokunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 15/486,454

(22) Filed: Apr. 13, 2017

(65) Prior Publication Data

US 2017/0368959 A1 Dec. 28, 2017

(30) Foreign Application Priority Data

Jun. 23, 2016 (JP) ................... 2016-124783

(51) Int. Cl.
*B60L 50/64* (2019.01)
*H01M 2/10* (2006.01)
(Continued)

(52) U.S. Cl.
CPC ............ *B60L 11/1879* (2013.01); *B60K 1/04* (2013.01); *B60L 50/64* (2019.02); *H01M 2/1077* (2013.01);
(Continued)

(58) Field of Classification Search
CPC ................ B60L 11/879; B60L 11/1883; B60L 11/1887; H01M 2/1077; H01M 2/1083;
(Continued)

(56) References Cited

U.S. PATENT DOCUMENTS

2011/0222240 A1* 9/2011 Kawata ................. B60L 3/00
361/690
2012/0103714 A1* 5/2012 Choi ................. B60K 1/04
180/68.5
(Continued)

FOREIGN PATENT DOCUMENTS

JP 08-192639 A 7/1996
JP 2008-184015 A 8/2008
(Continued)

OTHER PUBLICATIONS

Office Action for JP Patent Application No. 2016-124783, dated Dec. 5, 2017, 05 pages of Office Action and 06 pages of English Translation.
(Continued)

*Primary Examiner* — Susan D Leong
(74) *Attorney, Agent, or Firm* — Chip Law Group (57) ABSTRACT

An onboard battery includes predetermined members such as battery modules, and a housing case. An internal space of the housing case is partitioned by a partition plate into an upper space and a lower space in which the predetermined members are disposed, and the battery modules are disposed below the partition plate. The housing case has a bottom surface on which the battery modules are disposed, a front surface that has a front-side tightening part, and a rear surface that has a rear-side tightening part. The partition plate has a partition base that partitions the internal space of the housing case into the upper space and the lower space, a front-side fixation target part that is continuous with a front end of the partition base, and a rear-side fixation target part that is continuous with a rear end of the partition base.

16 Claims, 9 Drawing Sheets (51) Int. Cl.
   *B60L 11/18*   (2006.01)
   *B60K 1/04*    (2019.01)
(52) U.S. Cl.
   CPC ... *H01M 2/1083* (2013.01); *B60K 2001/0438* (2013.01); *B60K 2001/0466* (2013.01); *B60Y 2306/01* (2013.01); *B60Y 2410/10* (2013.01); *H01M 2220/20* (2013.01)
(58) Field of Classification Search
   CPC .......... H01M 2/0275; H01M 2/14; H01M 2/0237–0245; H01M 2/10–1083
   See application file for complete search history.

(56) References Cited

U.S. PATENT DOCUMENTS

| | | | |
|---|---|---|---|
| 2015/0079432 A1* | 3/2015 | Okuda | H01M 2/345 429/61 |
| 2015/0243950 A1 | 8/2015 | Hara et al. | |

FOREIGN PATENT DOCUMENTS

| | | |
|---|---|---|
| JP | 2008-269895 A | 11/2008 |
| JP | 2014221622 A | 11/2014 |
| JP | 2015-157584 A | 9/2015 |
| JP | 2015-202009 A | 11/2015 |

OTHER PUBLICATIONS

Decision to Grant a Patent for JP Patent Application No. 2016-124783, dated Jun. 5, 2018, 03 pages of Office Action and 03 pages of English Translation.

Notification of Reasons for Refusal for JP Patent Application No. 2016-124783, dated Dec. 5, 2017, 05 pages of Office Action and 04 pages of English Translation.

\* cited by examiner

ONBOARD BATTERY FOR VEHICLE

CROSS-REFERENCE TO RELATED APPLICATIONS

The present application claims priority from Japanese Patent Application No. 2016-124783 filed on Jun. 23, 2016, the entire contents of which are hereby incorporated by reference.

BACKGROUND

1. Technical Field

The present invention relates to the technical field of onboard batteries each having a battery module disposed below a partition plate in a housing case.

2. Related Art

Onboard batteries are installed in various vehicles, such as automobiles, in order to supply electric power to motors and other various electrical components. In recent years, in particular, vehicles such as electric vehicles (EV), hybrid electric vehicles (HEV), and plug-in hybrid electric vehicles (PHEV) have gained widespread use. In these electricity-driven vehicles, onboard batteries having a high electricity-storage function are installed.

Onboard batteries each include a battery module and a high-voltage device housed in a housing case. The battery module is configured by, for instance, arranging battery cells (secondary batteries), such as nickel hydrogen batteries or lithium ion batteries. Instances of the high-voltage device to be installed include inverters and DC/DC converters.

In some onboard batteries to be installed in an electric vehicle or the like, in order to retain a high electricity-storage function, battery modules are disposed in the housing case and battery cells in each of the battery modules are coupled in series or in parallel.

Such an onboard battery is disposed, for instance, in the cargo room formed in the back of a vehicle (see Japanese Unexamined Patent Application Publication No. 2014-221622).

When crashed from behind by another vehicle, an onboard battery disposed in the cargo room formed in the back of a vehicle receives especially great impact caused by the crash from behind. It is therefore necessary to protect each member disposed in the housing case.

Especially when the battery module receives impact, the impact can damage the battery module. It is then necessary to sufficiently protect the battery module.

Incidentally, some onboard batteries each have a battery module and a high-voltage device disposed on the upper shelf and lower shelf of the housing case partitioned by a partition plate, and have the battery module disposed on the lower shelf.

Such an onboard battery that has a battery module disposed below a partition plate can have the battery module damaged due to contact of the partition plate with the battery module when the partition plate is deformed or torn by impact from behind. It is therefore necessary to prevent the partition plate from coming into contact with the battery module, and protect the battery module.

SUMMARY OF THE INVENTION

It is desirable to prevent a partition plate from coming into contact with a battery module at impact from behind, and protect the battery module from the damage caused by the impact.

An aspect of the present invention provides an onboard battery that includes predetermined members comprising at least one battery module and a housing case an internal space of which is partitioned by a partition plate into an upper space and a lower space in which the predetermined members are disposed, and the at least one battery module is disposed below the partition plate. The housing case has a bottom surface on which the at least one battery module is disposed, a front surface that has a front-side tightening part, and a rear surface that has a rear-side tightening part. The partition plate has a partition base that partitions the internal space of the housing case into the upper space and the lower space, a front-side fixation target part that is continuous with a front end of the partition base, and a rear-side fixation target part that is continuous with a rear end of the partition base. The front-side fixation target part of the partition plate is fixed to the front-side tightening part, and the rear-side fixation target part of the partition plate is fixed to the rear-side tightening part. The bottom surface is made stronger than the rear surface. The rear-side fixation target part is made stronger than the partition base.

The partition base may have a bent part between the front-side fixation target part and the rear-side fixation target part, the bent part being bent to protrude upward.

A part of the partition base in front of the bent part may serve as a front-side surface, and a part of the partition base behind the bent part may serve as a rear-side surface. The front-side surface may be located at a higher position than a position of the rear-side surface.

A first high-voltage device and a second high-voltage device may be attached to the partition plate, the first high-voltage device and the second high-voltage device being located apart from each other in a longitudinal direction. The bent part may be located between the first high-voltage device and the second high-voltage device.

The bent part may be located from a left end to a right end of the partition plate.

Another aspect of the present invention provides an onboard battery that includes predetermined members comprising at least one battery module, and a housing case an internal space of which is partitioned by a partition plate into an upper space and a lower space in which the predetermined members are disposed, and the at least one battery module is disposed below the partition plate. The housing case has a bottom surface on which the at least one battery module is disposed, a front surface that has a front-side tightening part, and a rear surface that has a rear-side tightening part. The partition plate has a partition base that partitions the internal space of the housing case into the upper space and the lower space, a front-side fixation target part that is continuous with a front end of the partition base, and a rear-side fixation target part that is continuous with a rear end of the partition base. The front-side fixation target part of the partition plate is fixed to the front-side tightening part, and the rear-side fixation target part of the partition plate is fixed to the rear-side tightening part. The partition plate has a bent part between the front-side fixation target part and the rear-side fixation target part, the bent part being bent to protrude upward.

A part of the partition plate in front of the bent part may serve as a front-side surface, and a part of the partition base behind the bent part may serve as a rear-side surface. The front-side surface and the rear-side surface may be located in a horizontal state.

The front-side surface may be located at a higher position than a position of the rear-side surface.

A first high-voltage device and a second high-voltage device may be attached to the partition plate, the first high-voltage device and the second high-voltage device being located apart from each other in a longitudinal direction. The bent part may be located between the first high-voltage device and the second high-voltage device.

The bent part may be located from a left end to a right end of the partition plate.

DETAILED DESCRIPTION

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

An example of an onboard battery of the present invention will be described below with reference to the appended drawings.

Figure 1:
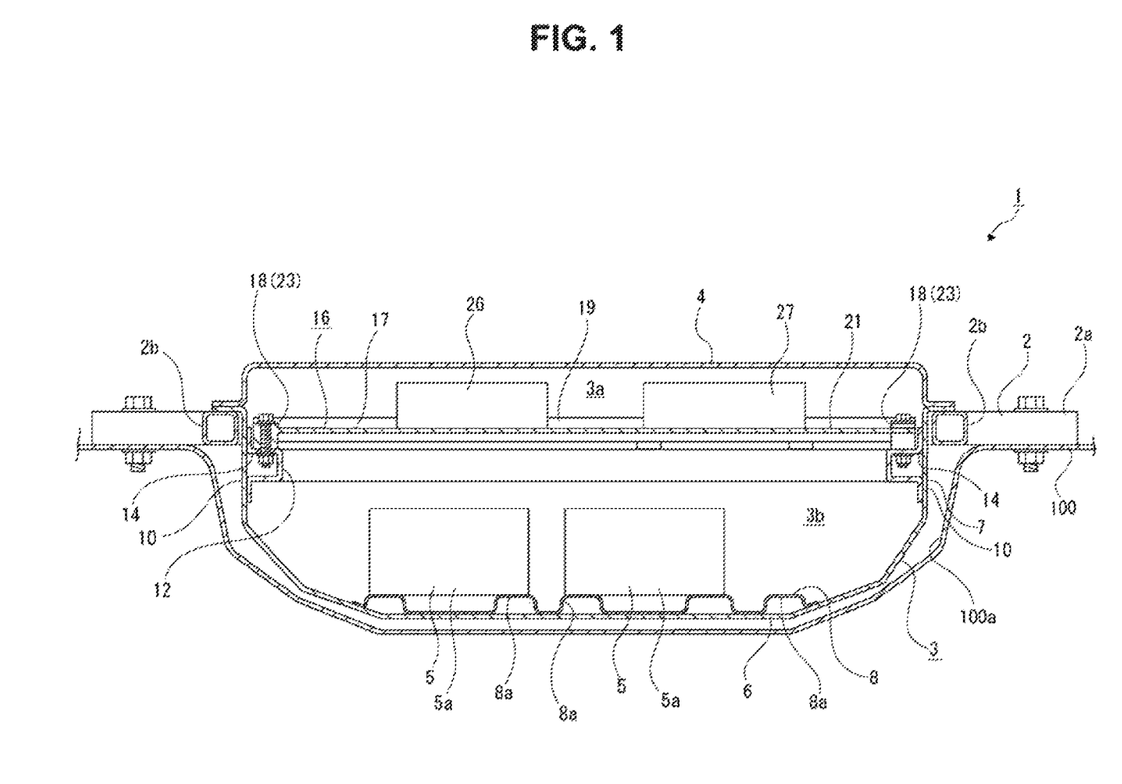
FIG. 1 illustrates an example of an onboard battery according to the present invention together with FIGS. 2 to 9, and is a cross-sectional view of the onboard battery.
Figure 2:
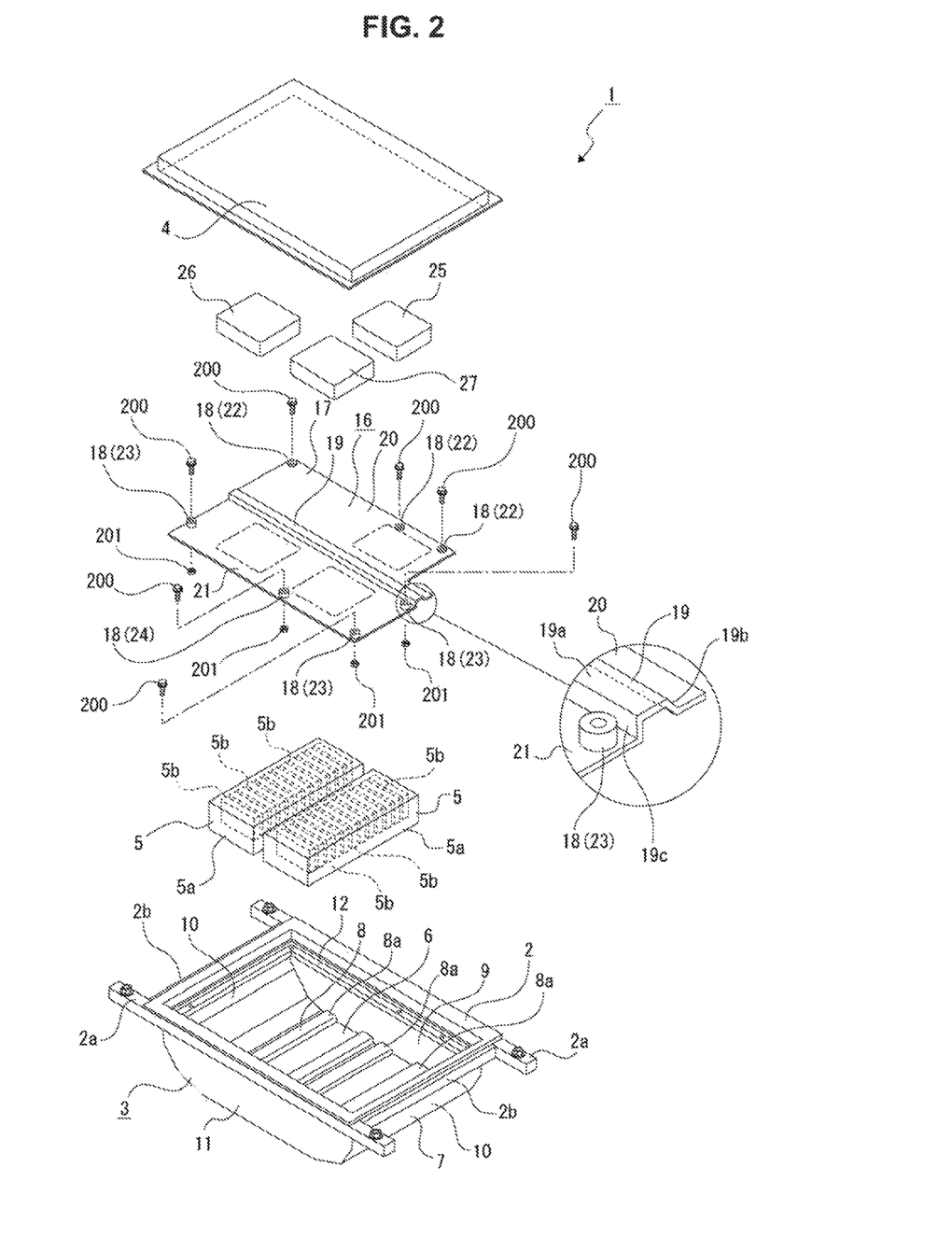
FIG. 2 is an exploded perspective view of the onboard battery.
Figure 3:
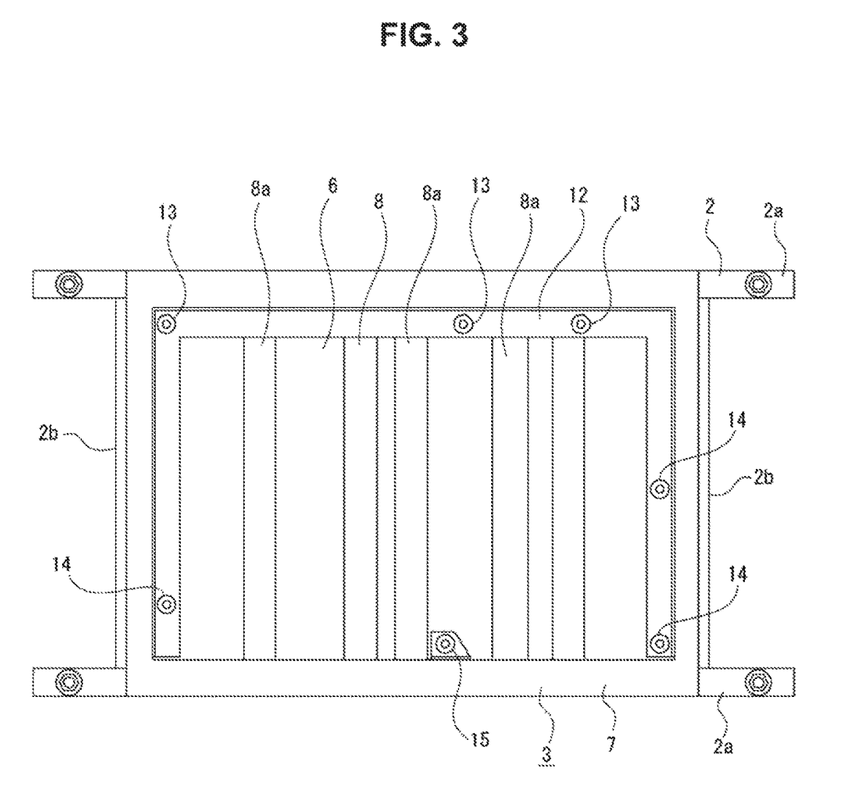
FIG. 3 is a plan view of the onboard battery with a cover body detached.

An onboard battery 1 includes a holding frame 2, a housing case 3, a cover body 4, and two battery modules 5 (see FIGS. 1 to 3).

The onboard battery 1 is partially inserted, for instance, into a disposition depression 100a on a floor panel 100 of a cargo room located behind the rear seats of a vehicle (see FIG. 1).

The holding frame 2 has two first parts 2a that extend in the transversal direction and are located apart from each other in the longitudinal direction and two second parts 2b that extend in the longitudinal direction and are located apart from each other in the transversal direction, which are joined into the shape of parallel crosses (see FIGS. 1 to 3). The left and right both ends of the two first parts 2a project sideward (outward) from the two second parts 2b.

The left and right both ends of the two first parts 2a of the holding frame 2 of the onboard battery 1 are fixed to the floor panel 100 with a bolt or the like.

The housing case 3 is shaped like a box having an upward opening, and has a bottom surface 6 facing the vertical direction, and a peripheral surface 7 whose lower edge is continuous with the outer peripheral edge of the bottom surface 6.

The bottom surface 6 includes three battery attachment members 8 located apart from each other in the transversal direction. The battery attachment member 8 includes one or two reinforcing members 8a that have a hat-shaped cross section and extend in the longitudinal direction. The bottom surface 6 is thus made stronger than the peripheral surface 7.

The bottom surface 6 includes the three battery attachment members 8 with the reinforcing members 8a that extend in the longitudinal direction, and are thus made stronger against impact especially from the longitudinal direction.

The peripheral surface 7 has a front surface 9, two side surfaces 10, and a rear surface 11. The upper end of the peripheral surface 7 of the housing case 3 is fixed to the holding frame 2.

The peripheral surface 7 includes a plate placement member 12 inside the front surface 9 and the two side surfaces 10. The plate placement member 12 is located from the rear end of one of the side surfaces 10 to the rear end of the other of the side surfaces 10 via the front surface 9 inside the peripheral surface 7, and is shaped to protrude inward.

The plate placement member 12 has bolt insertion holes at respective predetermined positions. The respective parts of the plate placement member 12 having bolt insertion holes on the front surface 9 serve as three front-side tightening parts 13. The respective parts of the plate placement member 12 having bolt insertion holes on the two side surfaces 10 serve as three lateral tightening parts 14.

The peripheral surface 7 has a rear-side tightening part 15 substantially at the center of the rear surface 11 in the transversal direction. The rear-side tightening part 15 has a bolt insertion hole. The rear-side tightening part 15 is located inside the rear surface 11, and shaped to protrude inward.

As described above, the front surface 9, the two side surfaces 10, and the rear surface 11 respectively have the three front-side tightening parts 13, the three lateral tightening parts 14, and the rear-side tightening part 15. The three front-side tightening parts 13 and the three lateral tightening parts 14 are located on the plate placement member 12, which extends in the peripheral direction of the peripheral surface 7. The rear-side tightening part 15 is located substantially at the center of the rear surface 11 in the transversal direction. The three front-side tightening parts 13 and the three lateral tightening parts 14 are thus made stronger than the rear-side tightening part 15.

The cover body 4 is shaped like a shallow box having a downward opening, placed on the top of the housing case 3, and attached to the housing case 3.

For instance, the two battery modules 5 are located apart from each other in the transversal direction and housed in the housing case 3. The two battery modules 5 are fixed to the three battery attachment members 8 of the bottom surface 6 by bolts or the like. The two battery modules 5 are fixed to the three battery attachment members 8 including the reinforcing members 8a. Accordingly, the two battery modules 5 are made difficult to damage especially when the housing case 3 receives impact from the longitudinal direction.

The battery module 5 includes a cell cover 5a with a box shape whose long-side direction is the longitudinal direction and battery cells 5b arranged side by side in the longitudinal direction inside the cell cover 5a (see FIG. 2).

There is a partition plate 16 disposed in the housing case 3 (see FIGS. 1 to 3). The internal space of the housing case 3 is partitioned into an upper housing space 3a and a lower housing space 3b by the partition plate 16. The two battery modules 5 are disposed in the lower housing space 3b.

The partition plate 16 has a plate partition base 17 that partitions the internal space of the housing case 3 into the upper and lower spaces, and fixation target parts 18 that are continuous with the outer periphery of the partition base 17.

The partition base 17 has a bent part 19 substantially at the center. The bent part 19 extends in the transversal direction. The bent part 19 is located, for instance, from the left end to the right end of the partition plate 16. The bent part 19 is shaped to protrude upward as compared with the other parts of the partition base 17.

The bent part 19 has a U-shaped cross section with a downward opening. As illustrated in FIG. 2, the bent part 19 has an intermediate surface 19a substantially facing the vertical direction, a front-side riser surface 19b continuous with the front edge of the intermediate surface 19a, and a rear-side riser surface 19c continuous with the rear edge of the intermediate surface 19a. The front-side riser surface 19b has a narrower vertical width than that of the rear-side riser surface 19c.

The part of the partition base 17 in front of the bent part 19 serves as a flat front-side surface 20 facing the vertical direction, and the part of the partition base 17 behind the bent part 19 serves as a flat rear-side surface 21 facing the vertical direction (see FIGS. 1 to 3). The front-side surface 20 and the rear-side surface 21 are located in a horizontal state. The rear edge of the front-side surface 20 is continuous with the lower edge of the front-side riser surface 19b of the bent part 19. The front edge of the rear-side surface 21 is continuous with the lower edge of the rear-side riser surface 19c of the bent part 19.

The front-side riser surface 19b has a narrower vertical width than that of the rear-side riser surface 19c, and the partition base 17 thus has the front-side surface 20 located at a higher position than that of the rear-side surface 21.

Figure 4:
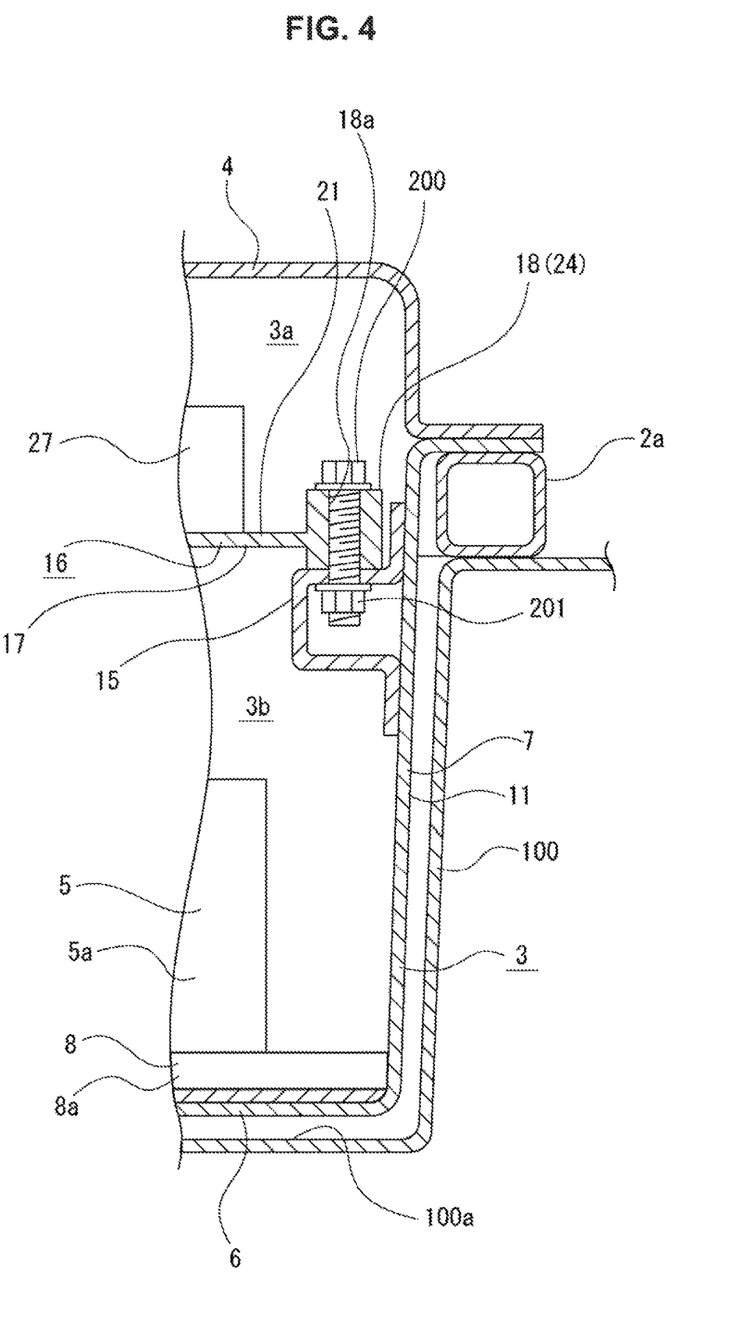
FIG. 4 is an enlarged cross-sectional view illustrating part of an internal structure of the onboard battery.

The fixation target part 18 is shaped like a tube having the axial direction agree with the vertical direction. The fixation target part 18 has a greater vertical length than the thickness of the partition base 17 (see FIG. 4). The fixation target part 18 is thus made stronger than the partition base 17. The center hole of the fixation target part 18 serves as an insertion hole 18a. For instance, the middle of the fixation target part 18 in the vertical direction is continuous with the outer periphery of the partition base 17.

As illustrated in FIG. 2, the fixation target parts 18 are constituted of three front-side fixation target parts 22 continuous with the front end of the partition base 17, three lateral fixation target parts 23 continuous with the left and right both ends of the partition base 17, and a rear-side fixation target part 24 continuous with the rear end of the partition base 17.

The three front-side fixation target parts 22 of the partition plate 16 are fixed to the three respective front-side tightening parts 13 of the front surface 9 of the housing case 3 from above. The three lateral fixation target parts 23 are fixed to the three respective lateral tightening parts 14 of the two side surfaces 10 of the housing case 3 from above. The rear-side fixation target part 24 is fixed to the rear-side tightening part 15 of the rear surface 11 of the housing case 3 from above. The fixation target part 18 is fixed by inserting a bolt 200 into the insertion hole 18a and the bolt insertion hole, and then tightening a nut 201 with the bolt 200 (see FIG. 4).

In the lower housing space 3b of the housing case 3, a battery control unit and a junction box that are not illustrated are housed on opposite sides in the transversal direction with the two battery modules 5 located therebetween. The battery control unit has a function of governing the entire control of the onboard battery 1. The junction box includes a relay, a fuse, a connector terminal, and the like.

There are a first high-voltage device 25 disposed in the front half of the upper housing space 3a of the housing case 3, and second high-voltage devices 26 and 27 disposed apart from each other in the transversal direction in the rear half (see FIGS. 1 and 2). The first high-voltage device 25 and the second high-voltage devices 26 and 27 are attached to the top of the partition base 17 of the partition plate 16.

The first high-voltage device 25 is, for instance, a pump inverter for an electric oil pump. The second high-voltage device 26 is, for instance, a DC/DC converter. The second high-voltage device 27 is, for instance, an inverter for a drive motor.

The bent part 19 of the partition plate 16 is located between the first high-voltage device 25 and the second high-voltage devices 26 and 27. The first high-voltage device 25 is attached to the front-side surface 20 of the partition base 17, and the second high-voltage devices 26 and 27 are attached to the rear-side surface 21 of the partition base 17.

The two battery modules 5, the battery control unit, the junction box, the first high-voltage device 25, the second high-voltage device 26, and the second high-voltage device 27 are disposed in the housing case 3. All the electrical components for driving the onboard battery 1 are covered with the cover body 4 and disposed in the housing case 3.

Accordingly, the electrical components for driving the onboard battery 1 can be shielded from electromagnetic noise from the outside. The strengthening of electromagnetic shielding ensures the onboard battery 1 an excellent driving state.

Figure 5:
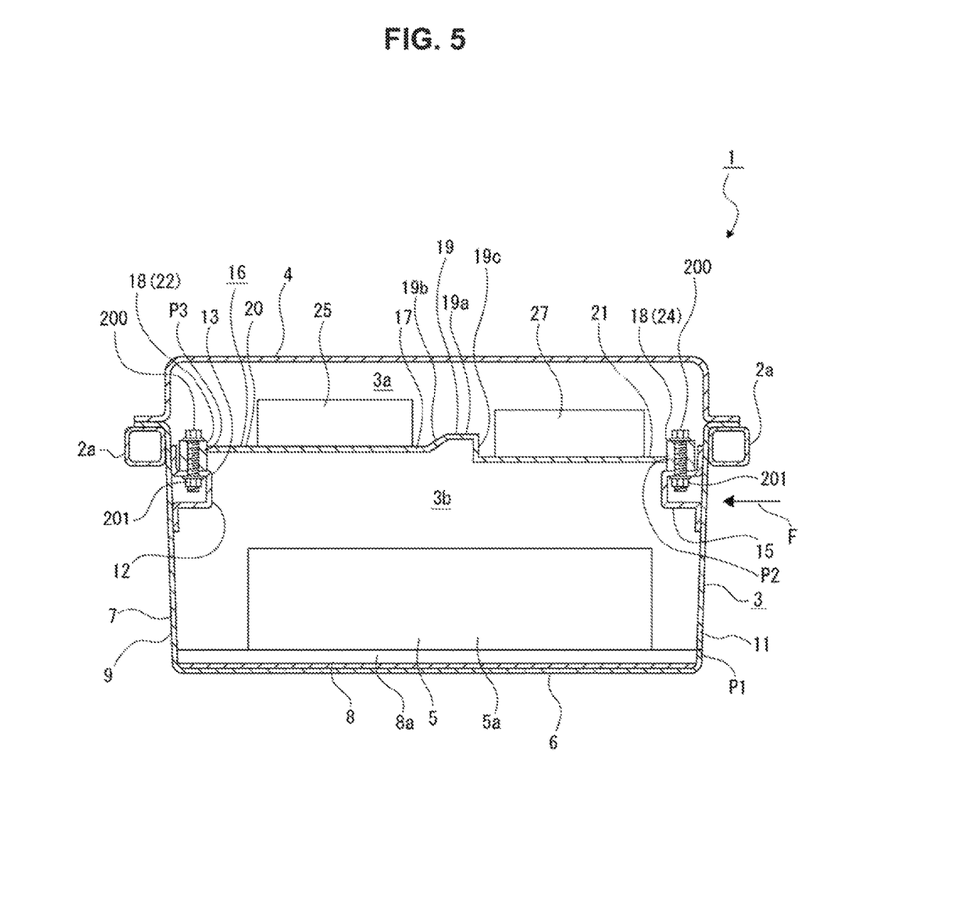
FIG. 5 is a cross-sectional view illustrating a state in which a rear surface of a housing case has not yet received any impact.

For instance, when crashed from behind by a vehicle, the onboard battery 1 configured as described above receives impact (arrow F illustrated in FIG. 5) from behind via the vehicle body. The impact is applied to the rear surface 11 of the housing case 3 (see FIG. 5).

Figure 6:
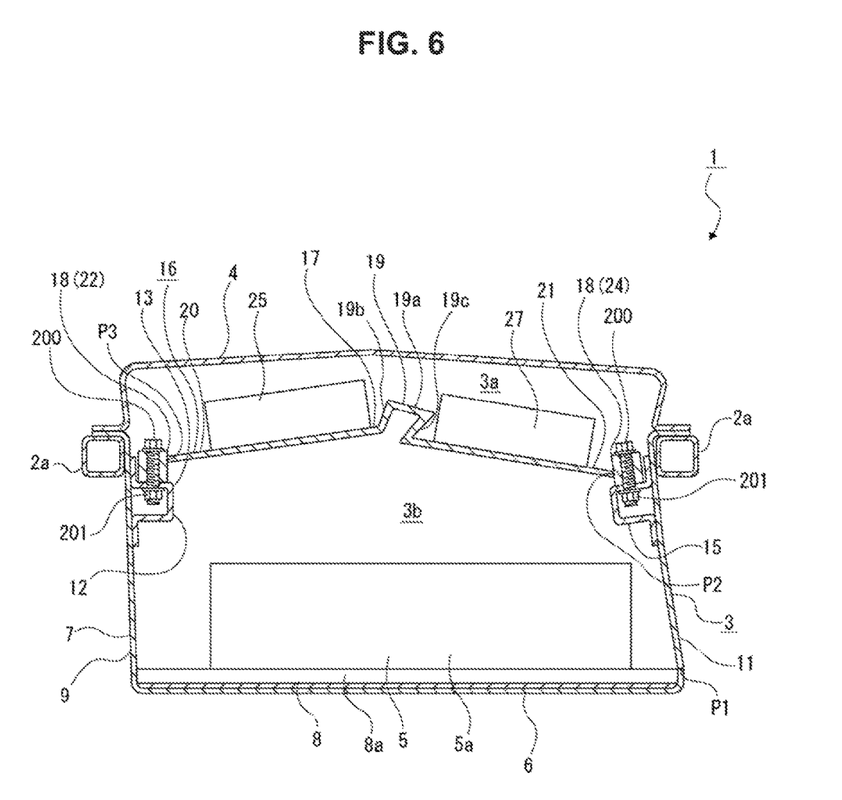
FIG. 6 is a cross-sectional view illustrating a state in which the rear surface of the housing case has just received impact.

When the rear surface 11 receives impact, the rear surface 11 is bent and deformed to incline downward on a continuous part P1 with the bottom surface 6 in the front direction because the bottom surface 6 of the housing case 3 is made stronger than the rear surface 11 (see FIG. 6). The front-side fixation target part 22 of the partition plate 16 is then fixed to the front-side tightening part 13, and the rear-side fixation target part 24 is thus made stronger than the partition base 17. Accordingly, the rear-side surface 21 is bent and deformed to incline upward on a continuous part P2 with the rear-side fixation target part 24 in the front direction.

Figure 7:
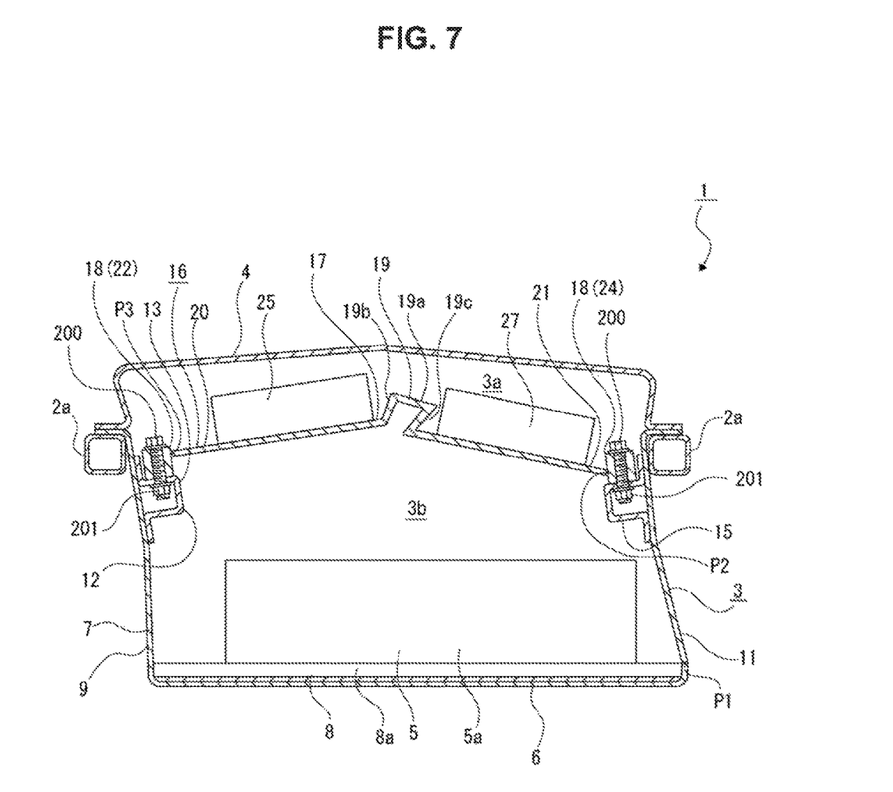
FIG. 7 is a cross-sectional view illustrating a state in which the rear surface of the housing case receives impact, and the impact is transferred to a front surface.

The rear-side surface 21 is deformed in this way to incline upward on the continuous part P2 with the rear-side fixation target part 24 in the front direction. The bent part 19 therefore receives the force in the direction the bent part 19 is displaced upward. When the force applied to the bent part 19 is transferred to the front-side surface 20 continuous with the bent part 19, the front-side surface 20 is bent and deformed to incline upward on a continuous part P3 with the front-side fixation target part 22 in the rear direction because the front-side fixation target part 22 is made stronger than the partition base 17 (see FIGS. 6 and 7).

If the rear surface 11 is deformed as described above when the rear surface 11 receives impact, the rear-side surface 21 is bent and deformed to incline upward on the continuous part P2 with the rear-side fixation target part 24 in the front direction and the front-side surface 20 is bent and deformed to incline upward on the continuous part P3 with the front-side fixation target part 22 in the rear direction. The partition base 17 is thus deformed upward as a whole to be apart from the two battery modules 5 located below the partition base 17, and avoids contact with the two battery modules 5.

Further, when the rear surface 11 receives impact, the bent part 19 is displaced upward. Accordingly, the rear-side impact is reduced that is transferred from the rear surface 11 to the front-side fixation target part 22 and the front-side tightening part 13 via the partition base 17.

Moreover, when the rear surface 11 receives impact, the bent part 19 is displaced upward, and the partition plate 16 is thus difficult to tear or crack.

As described above, the partition plate 16 of the onboard battery 1 has the front-side fixation target part 22 fixed to the front-side tightening part 13, and the rear-side fixation target part 24 fixed to the rear-side tightening part 15. The bottom surface 6 is made stronger than the rear surface 11. The rear-side fixation target part 24 is made stronger than the partition base 17.

Accordingly, when the rear surface 11 is deformed at impact from behind, the partition base 17 is displaced upward. It is thus possible to prevent the partition plate 16 from coming into contact with the two battery modules 5 at impact from behind, and protect the two battery modules 5 from the damage caused by the impact.

Further, the partition plate 16 has the bent part 19, which is bent to protrude upward, between the front-side fixation target part 22 and the rear-side fixation target part 24 of the partition base 17. Accordingly, when the rear surface 11 receives impact, the bent part 19 is displaced upward and the impact is reduced that is transferred to the front-side fixation target part 22 and the front-side tightening part 13. The front-side fixation target part 22 is difficult to unfix from the front-side tightening part 13. It is then possible to prevent the partition plate 16 from falling and coming into contact with the two battery modules 5.

Moreover, when the rear surface 11 receives impact, the bent part 19 is displaced upward, and the partition plate 16 is thus difficult to tear or crack. It is then possible to prevent a metal piece of the torn or cracked partition plate 16 from falling and damaging the two battery modules 5.

Further, the front-side surface 20 located in front of the bent part 19 of the partition base 17 is located at a higher position than that of the rear-side surface 21. Accordingly, when the rear surface 11 receives impact, the front-side surface 20 is difficult to displace below the rear-side surface 21. It is possible to definitely displace the partition plate 16 upward when the rear surface 11 receives impact.

Moreover, the first high-voltage device 25 and the second high-voltage devices 26 and 27 are attached to the partition plate 16. The first high-voltage device 25 and the second high-voltage devices 26 and 27 are located apart from each other in the longitudinal direction. The bent part 19 shaped to protrude upward is located between the first high-voltage device 25 and the second high-voltage devices 26 and 27.

The bent part 19 does not thus interfere with the first high-voltage device 25 and the second high-voltage devices 26 and 27. Accordingly, it is possible to dispose the first high-voltage device 25 and the second high-voltage devices 26 and 27 in the appropriate direction, and then prevent the two battery modules 5 from being damaged by impact.

Still further, the bent part 19 is located from the left end to the right end of the partition plate 16, and it is thus possible to displace the whole of the partition base 17 upward when the rear surface 11 receives impact, and definitely displace the whole of the partition base 17 upward when the rear surface 11 receives impact.

In addition, the rear-side tightening part 15 protrudes forward as compared with the other parts of the rear surface 11 and is ensured certain strength. Accordingly, when the rear surface 11 receives impact, the rear-side tightening part 15 is prevented from being displaced downward. The rear-side surface 21 is thus prevented from being excessively deformed (bent) on the continuous part P2 with the rear-side fixation target part 24 with respect to the rear-side fixation target part 24 of the partition base 17.

It is thus possible to prevent the partition plate 16 from being excessively deformed and make the partition plate 16 difficult to tear or crack. In addition, it is possible to prevent a metal piece of the torn or cracked partition plate 16 from falling and damaging the two battery modules 5.

Further, similarly, the front-side tightening part 13 protrudes backward as compared with the other parts of the front surface 9 and is ensured certain strength. Accordingly, when the rear surface 11 receives impact, the front-side tightening part 13 is prevented from being displaced downward. The front-side surface 20 is thus prevented from being excessively deformed (bent) on the continuous part P3 with the front-side fixation target part 22 with respect to the front-side fixation target part 22 of the partition base 17.

It is thus possible to prevent the partition plate 16 from being excessively deformed and make the partition plate 16 difficult to tear or crack. In addition, it is possible to prevent a metal piece of the torn or cracked partition plate 16 from falling and damaging the two battery modules 5.

The above describes as an instance the onboard battery 1 having the bent part 19 with a U-shaped cross section having a downward opening on the partition plate 16. However, as illustrated in FIGS. 8 and 9, it is also possible to use an onboard battery 1A or an onboard battery 1B including a partition plate 16A or a partition plate 16B different from the partition plate 16 in shape.

Figure 8:
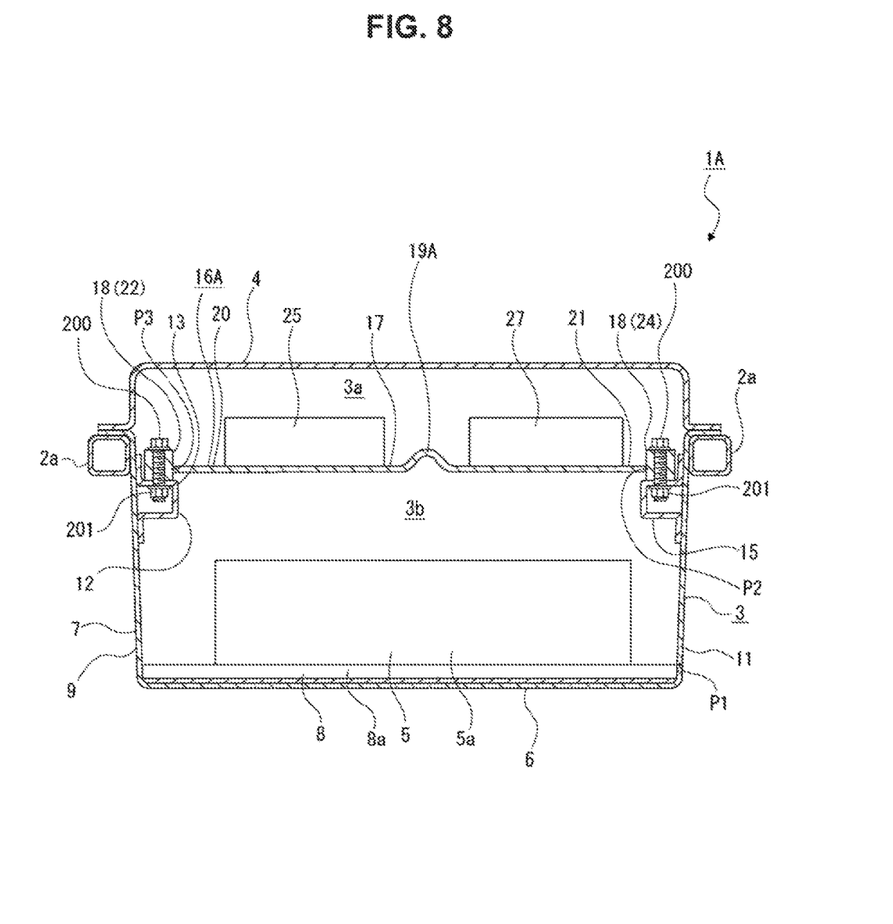
FIG. 8 is a cross-sectional view illustrating the onboard battery to which another partition plate is applied.

As illustrated in FIG. 8, the onboard battery 1A has, for instance, a mountain-shaped bent part 19A protruding upward in cross section on the partition plate 16A. Additionally, the partition plate 16A can have a bent part in any shape as long as the bent part applies force to the partition base 17 in the direction in which the partition base 17 is displaced upward when the rear surface 11 receives impact.

Figure 9:
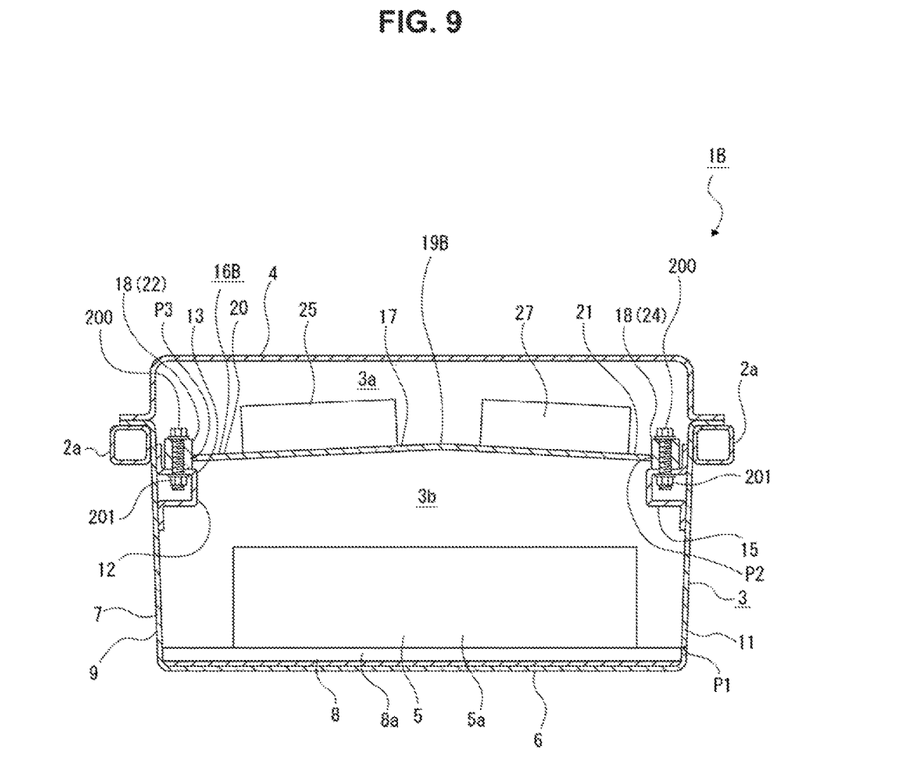
FIG. 9 is a cross-sectional view illustrating the onboard battery to which still another partition plate is applied.

Further, as illustrated in FIG. 9, the onboard battery 1B has the front-side surface 20 of the partition base 17 of the partition plate 16B inclined and displaced upward in the rear direction, and the rear-side surface 21 inclined and displaced upward in the front direction. The continuous part with the front-side surface 20 and the rear-side surface 21 serves as a bent part 19B.

Like the onboard batteries 1A and 1B, the use of the partition plates 16A and 16B, which have the bent parts 19A and 19B bent to protrude upward, allows the partition plates 16A and 16B to be deformed in the direction in which the bent parts 19A and 19B are displaced upward when the rear surface 11 is deformed at impact from behind. It is thus possible to prevent the partition plates 16A and 16B from coming into contact with the two battery modules 5 at impact from behind, and protect the two battery modules 5 from the damage caused by the impact.

Further, the onboard battery 1A has the front-side surface 20 and the rear-side surface 21 in a horizontal state, and the respective members are horizontally disposed on the front-side surface 20 and the rear-side surface 21. It is then possible to ensure that the respective members are appropriately disposed, and prevent the partition plate 16A from coming into contact with the two battery modules 5 when the rear surface 11 receives impact.

Additionally, similarly to the onboard battery 1, the onboard batteries 1A and 1B also have the front-side surface 20 of the partition plates 16A and 16B located at a higher position than that of the rear-side surface 21, thereby making it difficult to displace the front-side surface 20 below the rear-side surface 21 when the rear surface 11 receives impact. It is thus possible to definitely displace the partition plates 16A and 16B upward when the rear surface 11 receives impact.

Further, similarly to the onboard battery 1, the onboard batteries 1A and 1B can also have the bent parts 19A and 19B between the first high-voltage device 25 and the second high-voltage devices 26 and 27.

This prevents the bent parts 19A and 19B from interfering with the first high-voltage device 25 and the second high-voltage devices 26 and 27. Accordingly, it is possible to dispose the first high-voltage device 25 and the second high-voltage devices 26 and 27 in the appropriate direction, and then prevent the two battery modules 5 from being damaged at impact.

Moreover, similarly to the onboard battery 1, the onboard batteries 1A and 1B can also have the bent parts 19A and 19B from the left end to the right end of the partition plates 16A and 16B.

This displaces the whole of the partition plates 16A and 16B upward when the rear surface 11 receives impact. It is possible to definitely displace the whole of the partition plates 16A and 16B upward when the rear surface 11 receives impact.

According to the example, when the rear surface is deformed at impact from behind, the partition base is displaced upward. It is thus possible to prevent the partition plate from coming into contact with the battery modules at impact from behind, and protect the battery modules from the damage caused by the impact.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. An onboard battery, comprising:
predetermined members comprising at least one battery module;
a housing case comprising an internal space which is partitioned by a partition plate into an upper space and a lower space, wherein the predetermined members are disposed in each of the upper space and the lower space, and the at least one battery module is disposed below the partition plate, wherein
the housing case has a bottom surface on which the at least one battery module is disposed, a front surface that has a front-side tightening part, and a rear surface that has a rear-side tightening part,
the partition plate has a partition base that partitions the internal space of the housing case into the upper space and the lower space, a front-side fixation target part that is continuous with a front end of the partition base, and a rear-side fixation target part that is continuous with a rear end of the partition base,
the front-side fixation target part of the partition plate is fixed to the front-side tightening part, and the rear-side fixation target part of the partition plate is fixed to the rear-side tightening part,
a bent part is provided between a flat front-side surface fixed to the front-side fixation target part and a flat rear-side surface fixed to the rear-side fixation target part,
the bottom surface is made stronger than the rear surface, and
the rear-side fixation target part is made stronger than the partition base,
wherein, when impact is applied from outside to the rear surface of the housing case, the rear surface is deformed and the partition base is able to bend upward towards a housing cover of the housing case forming said bent part.

2. The onboard battery according to claim 1, wherein the bent part being bent to protrude upward.

3. The onboard battery according to claim 2, wherein a part of the partition base in front of the bent part serves as the flat front-side surface, and a part of the partition base behind the bent part serves as the flat rear-side surface, and
the flat front-side surface is located at a higher position than a position of the flat rear-side surface.

4. The onboard battery according to claim 2, wherein a first high-voltage device and a second high-voltage device are attached to the partition plate, the first high-voltage device and the second high-voltage device being located apart from each other in a longitudinal direction, and
the bent part is located between the first high-voltage device and the second high-voltage device.

5. The onboard battery according to claim 2, wherein the bent part is located from a left end to a right end of the partition plate.

6. An onboard battery, comprising:
predetermined members comprising at least one battery module;
a housing case comprising an internal space which is partitioned by a partition plate into an upper space and a lower space, wherein the predetermined members are disposed in each of the upper space and the lower space, and the at least one battery module is disposed below the partition plate, wherein
the housing case has a bottom surface on which the at least one battery module is disposed, a front surface that has a front-side tightening part, and a rear surface that has a rear-side tightening part,
the partition plate has a partition base that partitions the internal space of the housing case into the upper space and the lower space, a front-side fixation target part that is continuous with a front end of the partition base, and a rear-side fixation target part that is continuous with a rear end of the partition base,
the front-side fixation target part of the partition plate is fixed to the front-side tightening part, and the rear-side fixation target part of the partition plate is fixed to the rear-side tightening part, and
the partition plate has a bent part between a flat front-side surface fixed to the front-side fixation target part and a rear-side surface fixed to the rear-side fixation target part, the bent part being bent to protrude upward,
wherein, when impact is applied from outside to the rear surface of the housing case, the rear surface is deformed and the partition base is able to bend upward towards a housing cover of the housing case forming said bent part.

7. The onboard battery according to claim 6, wherein
a part of the partition plate in front of the bent part serves as the flat front-side surface, and a part of the partition base behind the bent part serves as the rear-side surface, and
the flat front-side surface and the rear-side surface are located in a horizontal state.

8. The onboard battery according to claim 7, wherein
the flat front-side surface is located at a higher position than a position of the rear-side surface.

9. The onboard battery according to claim 6, wherein
a first high-voltage device and a second high-voltage device are attached to the partition plate, the first high-voltage device and the second high-voltage device being located apart from each other in a longitudinal direction, and
the bent part is located between the first high-voltage device and the second high-voltage device.

10. The onboard battery according to claim 7, wherein
a first high-voltage device and a second high-voltage device are attached to the partition plate, the first high-voltage device and the second high-voltage device being located apart from each other in a longitudinal direction, and
the bent part is located between the first high-voltage device and the second high-voltage device.

11. The onboard battery according to claim 6, wherein
the bent part is located from a left end to a right end of the partition plate.

12. The onboard battery according to claim 7, wherein
the bent part is located from a left end to a right end of the partition plate.

13. The onboard battery according to claim 3, wherein
a first high-voltage device and a second high-voltage device are attached to the partition plate, the first high-voltage device and the second high-voltage device being located apart from each other in a longitudinal direction, and
the bent part is located between the first high-voltage device and the second high-voltage device.

14. The onboard battery according to claim 3, wherein
the bent part is located from a left end to a right end of the partition plate.

15. The onboard battery according to claim 3, wherein
the bent part is located from a left end to a right end of the partition plate.

16. The onboard battery according to claim 1, wherein
the partition plate further has lateral fixation target parts that are continuous with both left and right ends of the partition base.

* * * * *